J. McF. Lyeth,
Coffin.
Nº 11,166.   Patented June 27, 1854.

UNITED STATES PATENT OFFICE.

JOHN McF. LYETH, OF BALTIMORE, MARYLAND.

COFFIN.

Specification of Letters Patent No. 11,166, dated June 27, 1854.

*To all whom it may concern:*

Be it known that I, JOHN McF. LYETH, of Baltimore, in the State of Maryland, have invented, discovered, or produced a new and useful Article of Commerce or Manufacture, which I denominate a "Marble-Slab Coffin;" and I do hereby declare the following to be a full, clear, and exact description of the same, reference being had to the accompanying drawings, making a part thereof, in which—

Figure 1:
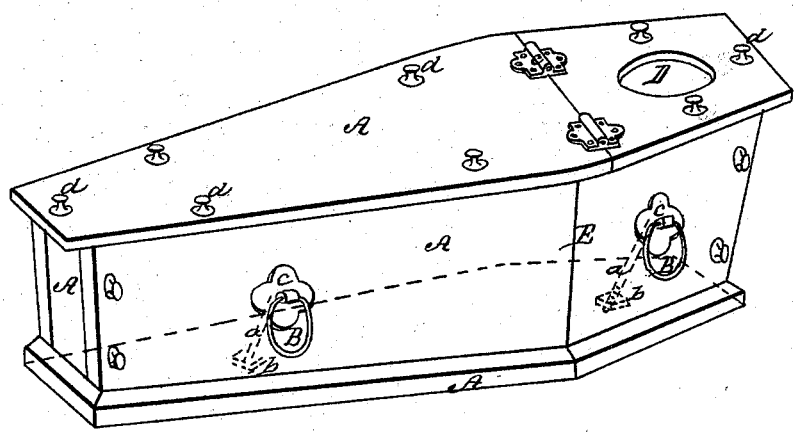
Figure 2:
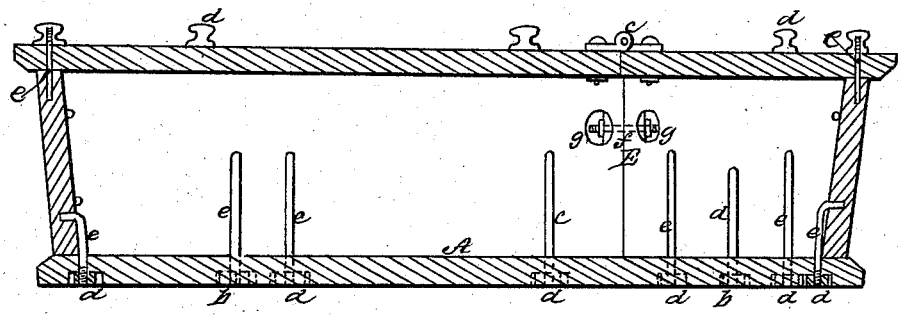

Figure 1, represents the coffin complete; and Fig. 2, represents a longitudinal vertical section through the same.

Similar letters in both the figures denote like parts.

I am aware that stone, earth, glass and other similar substances, have been used in the construction of coffins. But in all these the body of the coffin was made in one piece, and the lid in another or probably, in two pieces. As I confine myself strictly to the construction of stone coffins, I shall not speak of any other than those heretofore made of stone, and only so far, as to show the difference between what I claim, and what has been done heretofore.

Sarcophagi have been known and used for ages, but these are cut from the solid stone, and are expensive, heavy, difficult to transport, and moreover confined at the present day to the cheaper qualities of marble, as the whole of the material from the inside is lost or wasted.

The nature of my invention relates to the manufacture of marble or stone coffins, out of slabs, sawed to the proper degree of thickness, and secured together by pins, dowels or rods, so that the bottom, sides, ends, and top may all be secured to each other, and so arranging the handles therein as that when it is lifted, the weight shall come on the bottom slab, and which entire coffin thus formed, I consider a new article of manufacture not hitherto known or used.

To enable others skilled in the art to make and use my invention, I will proceed to describe the same, with reference to the drawings.

A, represents the sides, top, bottom, and ends of the coffin, which may be made of the finest Italian marble sawed into slabs of such thickness as will give the article strength enough to be lifted and transported; and for the purposes of economy I make the bottom slab the heavier, (and it may be of less expensive marble than the other parts), as it supports the entire weight of the coffin when raised up by the handles B, which although at the sides, really lift from the bottom, as seen in Fig. 1, where *a* represents in dotted lines, the rods passing from the handles through the side and bottom, and secured by a nut *b* underneath the bottom.

C, is an escutcheon, to cover the hole for the rod *a*. The top may be hinged as at *c*, with a glass, or other transparent material covering an opening D, and said top is connected to the lower part, by means of nuts *d*, upon the rods *e*, which rods are secured in the slabs, or the nuts may be secured and the rods screwed into them. The joint E, may be held together by a rod *f*, with a thread and nut *g* at each end of it. The joints may be closed with cement, so as to make the coffin air tight, and the rods or nuts by which the several parts are connected together, may be so formed as to be almost entirely concealed, or where exposed made ornamental, the object being to firmly secure the slabs together, and throw the weight thereof when raised or carried by the handles onto the bottom slab, by which means the sides, ends and top may be made more light, and the whole less liable to be injured. The advantages are, in the great saving of material, as it may be sawed up into slabs, its lightness and strength in view of the material used, and its cheapness when compared with coffins cut out from the solid block, as they may be made of the finest Italian marbles, at the same or even less expense, than one cut out from the more common kind of marbles.

Having thus fully described the nature of my invention, what I claim therein as new and desire to secure by Letters Patent is—

The method herein described of constructing marble slab coffins, so that the joints shall be tight, and strongly secured to each other and to the bottom, and when raised by the handles, the weight shall come upon the bottom slab, substantially as described, the whole forming a new article of commerce not hitherto known, or used.

JOHN McF. LYETH.

Witnesses:
A. B. STOUGHTON,
SAML. GRUBB.